(Model.)
W. F. RIKEMAN.
COMPOSITION FOR COVERING PIANO KEYS, &c.
No. 271,120. Patented Jan. 23, 1883.
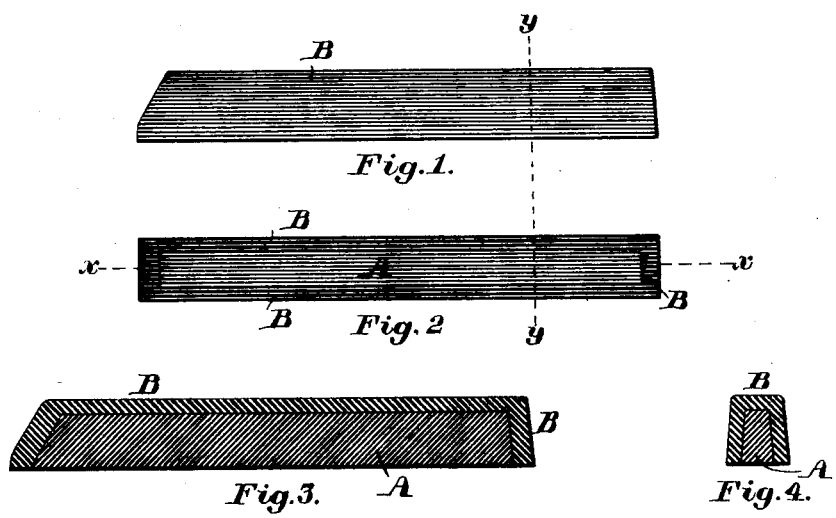
Witnesses:
Walter E. Lombard.
E. A. Hemmenway.
Inventor:
Walter F. Rikeman
by N. C. Lombard
Attorney.

UNITED STATES PATENT OFFICE.

WALTER F. RIKEMAN, OF CAMBRIDGE, MASSACHUSETTS.

COMPOSITION FOR COVERING PIANO-KEYS, &c.

SPECIFICATION forming part of Letters Patent No. 271,120, dated January 23, 1883.

Application filed April 24, 1882. (Specimens.)

*To all whom it may concern:*

Be it known that I, WALTER F. RIKEMAN, of Cambridge, in the county of Middlesex and State of Massachusetts, have invented a new and useful Composition for Covering Piano-Keys and other Articles, of which the following, taken in connection with the accompanying drawings, is a specification.

My invention relates to the art of making various articles in imitation of polished ebony; and it consists, first, of a composition, to be applied to articles of wood or other cheap material while in a plastic and heated state, composed of gypsum, shellac, silica, and ivory-black, as will be more fully described.

It further consists of a piano, organ, or other musical-instrument key composed wholly or in part of a composition of gypsum, shellac, silica, and ivory-black.

It further consists of a piano, organ, or other musical-instrument key composed of a wooden core covered with a composition of gypsum, shellac, silica, and ivory-black.

Figure 1 of the drawings is a side elevation of a piano-key illustrating the application of my invention. Fig. 2 is an inverted plan of same. Fig. 3 is a longitudinal section on line $x\,x$ on Fig. 2, and Fig. 4 is a transverse section on line $y\,y$ on Figs. 1 and 2.

A is the core of wood, covered upon its two ends, its two nearly-vertical sides, and its top surface with a thick jacket of composition, B, as shown; but it is evident that its bottom may be covered with the composition, if desired.

The short finger-keys of pianos, organs, and other similar musical instruments have heretofore generally been made of wood, and as it has been the universal practice to have them of a black color ebony has been selected as the wood best adapted for the purpose; but the great cost of ebony and the expense of polishing the keys after they have been worked to the desired shape have been the cause of many attempts to find a substitute for the ebony which will take a good polish, wear well, and that can be furnished at a less cost. This desirable end is attained by the use of my improved composition, which is produced as follows: I first mix, in a dry or powdered state, the following ingredients, in about the proportions given, viz.: gypsum, sixty parts; shellac, thirty parts; silica, ten parts, and ivory-black ten parts. The mass is then passed between heated rollers till it becomes thoroughly plastic, when it is rolled into sheets of the desired thickness.

When it is desired to apply the composition to the covering of articles of wood, the core A is prepared of the desired shape of the article to be produced, but somewhat smaller, a sheet of the composition is applied thereto, of suitable size to cover one or all sides thereof, as may be desired, while in a hot state, and therefore plastic, and then the core and its covering are placed together in a heated die and subjected to a heavy pressure to complete the shaping of the covering, cause it to adhere to the wooden core, and impart to it the desired polish.

The core A may be made of any close-grained hard wood, or for some purposes of soft wood, and may be covered with the composition as it comes from the heated rolls; or the sheets of composition may be allowed to cool and harden and be kept in that condition for an indefinite time, and when required for use said sheets may be softened again by applying heat thereto, when they may be wrapped around the cores, as described.

By the use of this composition many small articles can be produced very cheaply and of excellent quality—as, for instance, the short keys or sharps of pianos, organs, and other musical instruments may be made much cheaper than the ebony keys now in general use, and that will wear as well as ivory, be easy to the touch, and always present a smooth, polished surface.

Another great advantage of this invention is that, if desired, the article may have, when taken from the die, a highly-polished surface, which it retains permanently, and hence the expense of polishing the key, as is required when ebony is used, is saved; or, if desired, the die may be so roughened as to impart to the surface of the article a dull or unpolished surface, which may be desirable for some purposes.

What I claim as new, and desire to secure by Letters Patent of the United States, is—

1. A composition for covering articles of wood, composed of gypsum, shellac, silica, and ivory-black, combined in about the proportions described.

2. A finger-key for pianos, organs, and other musical instruments, composed wholly or in part of a composition of gypsum, shellac, silica, and ivory-black, combined in about the proportions described.

3. A finger-key for pianos, organs, and other musical instruments, composed of a core of wood and a covering of the composition herein described, united thereto and shaped to the desired form by pressure.

Executed at Cambridge, Massachusetts, this 21st day of April, A. D. 1882.

WALTER F. RIKEMAN.

Witnesses:
 WILLIAM H. MARTIN,
 WM. F. LANDER.